United States Patent [19]
Gorman et al.

[11] 3,917,413
[45] Nov. 4, 1975

[54] CHROMATOGRAPHIC COLUMN SCANNING APPARATUS

[75] Inventors: Lee A. Gorman, Florissant; Thomas R. Romer, Maplewood, both of Mo.

[73] Assignee: Ralston Purina Company, St. Louis, Mo.

[22] Filed: July 17, 1974

[21] Appl. No.: 489,193

[52] U.S. Cl. ................................. 356/197; 73/23.1
[51] Int. Cl.² .................. G01N 21/00; G01N 31/08
[58] Field of Search .................. 356/197; 210/31 C; 73/23.1

[56] References Cited
UNITED STATES PATENTS
2,677,304  5/1954  Wallingford ...................... 356/197

*Primary Examiner*—Alfred E. Smith
*Assistant Examiner*—Richard A. Rosenberger
*Attorney, Agent, or Firm*—R. W. Brukardt; V. B. Hill; V. Peoples, Jr.

[57] ABSTRACT

A scanning device is disclosed for use with a spectrophotometer or similar apparatus to provide quantitative measurement of chromatographic bands directly on a chromatographic column. The device comprises generally a support surface having a rotatable element, preferably a roller, having a drive means to rotate said element. A retaining means is also provided to retain the column in contact with the element, with the retaining means preferably comprising a free wheeling or idler roller spaced in parallel relation to the driven rotatable element. Rotation of the column during scanning provides a representative sampling of band intensity on the column thereby providing an accurate, quantitative measurement of a substance as represented by the chromatographic band.

6 Claims, 2 Drawing Figures

CHROMATOGRAPHIC COLUMN SCANNING APPARATUS

BACKGROUND OF THE INVENTION

This invention generally relates to a scanning apparatus which permits the quantitative measurement of chromatographic bands directly on a chromatographic column.

Chromatography has in recent years become a highly versatile separation and measurement technique employed in analytical chemistry. The technique is particularly useful in separating similar organic substances and providing a means for the measurement of these substances in a complex medium. Chromatography has generally evolved into a number of different fields, including gas chromatography, column chromatography, thin layer chromatography and liquid chromatography. All of these generally provide a means of separating and quantitating organic substances in a complex mixture and each particular type of chromatography has its respective strengths and weaknesses. Gas chromatography, for example, involves the volatilization in a heated zone of an organic substance which is swept through an absorbant column by a carrier gas. Depending on the type of substance, its functional groups, molecular weight, vapor pressure etc., it will have varying degrees of retention on the column, thereby providing a means of separating a particular substance from a complex mixture. Measurement of the substance can be made with a suitable detector, which by comparison with a known amount of the same material provides a quantitative measurement of the particular substance.

Thin layer chromatography, on the other hand, is a separation technique where a thin layer of an absorbant material such as silica gel or the like is coated on a glass plate and the mixture to be separated is concentrated in a single spot on the plate. The plate is placed in a "developing" solvent which provides a mobile phase for the organic substances in the mixture to be separated. Again, the functional groups, polarity of the mobile phase, molecular weight of the substance determines the degree of its migration on the absorbant material. In this manner, a single component can be isolated from a complex mixture, and by comparing the relative migration of the component and the standard on the plate, quantitative measurement can be made.

Recently, devices have been specifically developed for quantitative measurement of substances on thin layer plates. These include densitometers or spectrophotometers which measure either emitted fluorescence radiation, reflected or transmitted light, which is absorbed by the substance on the plate in either the visible or ultraviolet region of the spectrum, as compared to the standard on the same plate, thereby providing a quantitative measurement of the separated component.

Column chromatography, including partition and absorption chromatography has proven to also be a useful separation tool. This method generally consists of providing a cylindrical column of absorbant, concentrating the mixture to be separated on top of the column and eluting the mixture on the column by gravity flow, with a mobile solvent or mixture of solvents. Again, depending on the structure, molecular weight, etc., different substances will migrate to a different degree, thereby separating the components of the mixture. A single component can be, therefore, easily separated from a mixture. However, if quantitative measurement of the component is desired, the only alternative was to completely elute the substance from the column, and carry out spectrophotometric measurement on the solution. As compared to thin layer chromatography, however, direct quantitative measurement of a component in a mixture which has been separated from the mixture in the form of a distinct band on a chromatographic column was considered to be impractical with existing instruments such as a spectrophotometer or densitometer. This impracticality is due to the fact that simply measuring the intensity or absorbance at a single spot in the band, provides an inaccurate measurement of the intensity of the material since the chromatographic band is rarely uniform and hence a more accurate estimate could be made if a number of spots on the band were to be measured. This "averaging" of the intensity by measurement of a number of places on the "spot" is employed in thin layer chromatography by slowly moving the plate with the separated components on them in a planar direction to measure the intensity over the entire "spot" of the separated substance on the plate; thereby providing a good quantitative measurement of the substance.

It is, therefore, an object of the present invention to provide a means of quantitatively measuring the intensity of a column chromatographic band directly on the column by measuring a number of points on the band.

It is also a specific object of the present invention to provide an apparatus for the scanning of a column chromatograph with a spectrophotometric, densitometer or fluorometric reading device.

It is also an object to provide an apparatus which moves the column in such a manner to provide a quantitative measurement of the band's intensity along a portion of the circumference of the band, thereby measuring a number of points on the band and providing an averaging of the band's intensity. The averaged intensity can be applied to quantitatively measure the band's intensity directly on the column.

SUMMARY OF THE INVENTION

The present invention comprises a scanning apparatus for the optical measurement of chromatographic bands on chromatographic columns which comprises generally a support surface having a rotatable element with a drive means to rotate said element, and a means for retaining the column in contact with the rotatable element. In this manner, the column is rotated and optical measurement of reflected light, transmitted light, or fluorescence of a portion of the circumference of a particular chromatographic band on the column can be carried out. Rotation of the column permits a quantitative measurement of the band intensity over a larger area of the band than would be obtained without rotation of the column and provides an averaging of the band's intensity for a relatively accurate quantitative measurement of the substance which the band represents.

The rotatable element having a drive means to rotate the element, preferably comprises a roller with sprockets or gears which mesh with a means to rotate the element at a fixed speed. It is also preferred that the means for retaining of the column in rolling contact with the driven rotatable element comprises a free wheeling or idler roller is a spaced parallel relationship to the driven rotatable element to cooperatively, with the rotatable element, provide support for the chromatographic column to permit scanning of chromatographic bands during rotation of the column.

The spaced parallel relationship between the rotatable element and retaining means optionally permits the use of a light source or an optical measuring head below the column with resultant measurement of either transmitted light or fluorescence whereas if the light source or optical measuring head is above the column, the reflected light or fluorescence can be used to measure band intensity and hence provide quantitative measurement of a particular substance.

DESCRIPTION OF THE PREFERRED EMBODIMENTS

Figure 1:
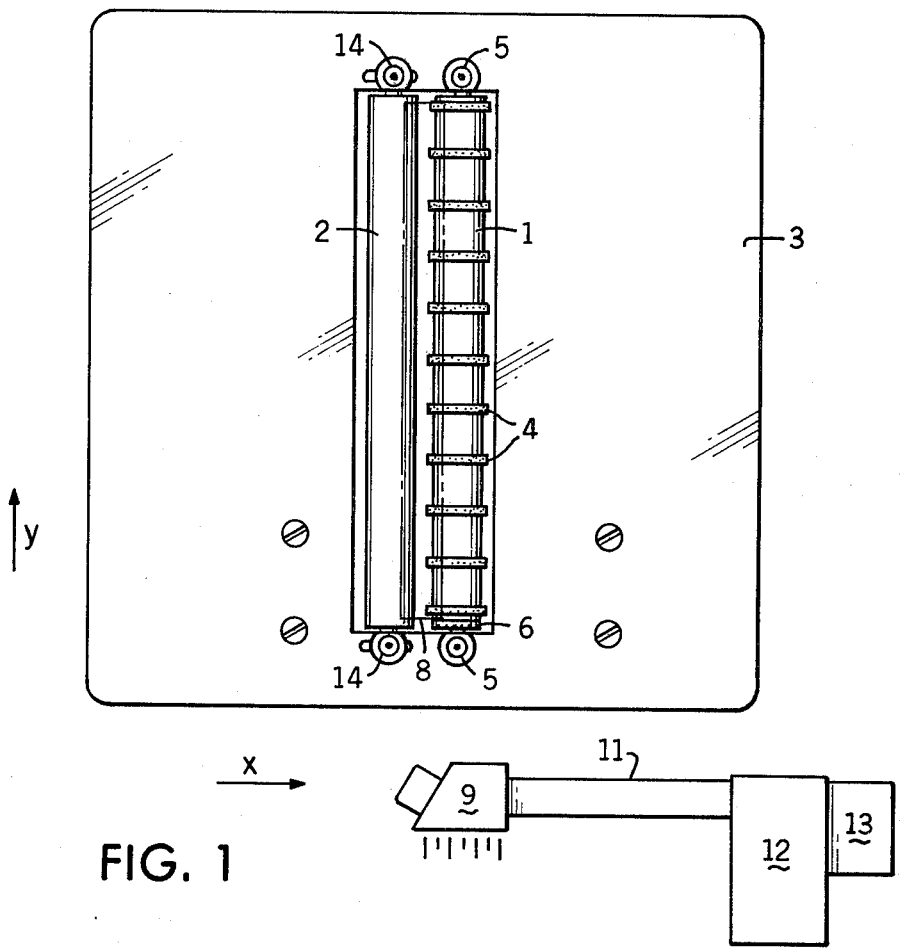
FIG. 1 is a top view of a specific and preferred embodiment of the scanning apparatus of the instant invention.

Referring specifically to FIG. 1, a top view is shown of a specific and preferred embodiment of the instant invention. A support surface 3 is provided which is not limited to a specific structure since this will be dependent on the specific type of instrument used for optical measurement of the chromatogram, although in this instance a rectangular plate, with the surface being black to minimize light reflection is suitable, having an opening in the center thereof for the elements used for rotation of the chromatographic column to permit scanning thereof.

A rotatable element 1 comprises the principal means of rotating chromatographic column 8. Rotatable element 1 has a drive means 6 to provide rotation of the element, which is meshed with a means to rotate the column such as a fixed or variable speed motor. It is preferred, although not limiting in the present invention, that rotatable element 1 comprise a roller having at least part of the surface thereof covered with a nonreflective high frictional coating 4 such as rubber, plastic, or abrasive of some type to insure uniform rotation of chromatographic column 8. The rotatable element is fixed to the support surface with bearings and pins 5 which permit free rotation of the element when the drive means is in operation.

A means 2 for retaining the column in contacting relationship with rotatable element 1 is provided, and connected to the support surface by pins and bearings 14. This retaining means 2, preferably comprises a roller, but could comprise a fixed surface of any type which permits free rotation of the column when the drive means is in operation. In this regard, it is preferred that the retaining means 2 be an idler roller or free wheeling roller which is free to move or rotate from the support surface 3 without regard to the rotation of rotatable element 1. The roller 2 is preferably provided in the opening of the support surface 3 in a variable spaced parallel relationship to rotatable element 1 to provide support for column 8 and permit uniform rotation of the column. Spacing between the rotatable element 1 and retaining means 2 should not be considered critical to the operativeness of the present invention since the degree of spacing would only become important if the light source used to provide activating radiation for the chromatographic band is below the column and the transmittance of the light through the column is measured, or in the event the light beneath the column is used as an activating radiation for fluorescent measurement of the intensity of the chromatographic band.

Figure 2:
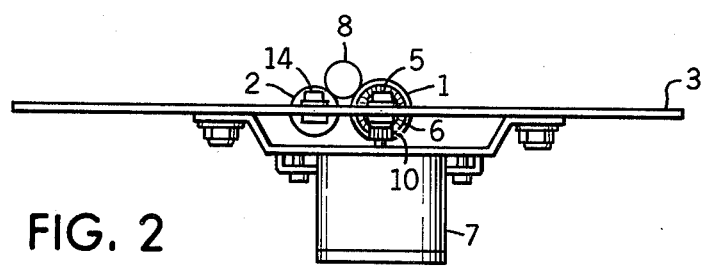
FIG. 2 is a side view of a specific and preferred embodiment of the scanning apparatus of the instant invention together with a typical spectrophotometric device used for optical measurement of the chromatographic bands on the column.

With specific reference to FIG. 2 which provides a side view of a specific embodiment of the instant apparatus, rotatable element 1 is illustrated together with drive means 6 which provides rotation of the element and preferably comprises gears which mesh with the gears 10 of drive motor 7 to rotate the element at a fixed speed, although the particular speed or type of motor, as well as the specific drive means should not be considered limiting in the present apparatus.

Also, with reference to FIG. 2, an optical measurement means is generally illustrated in FIG. 2 and a typical but not limiting system is illustrated for optical measurement of the chromatographic bands on the column by scanning of a portion of the circumference of the band to provide a representative sample or an averaging of band intensity. The resultant intensity of a sample may be compared to a standard to thereby quantitatively measure a particular substance in a mixture. As previously noted, the present scanning apparatus is adaptable to an optical system that could measure absorbance or reflectance in either the visible or ultraviolet region of the spectrum as well as fluorescence bases upon an activating radiation source which is either above or below the chromatographic column. A typical spectrophotometric device for measuring the intensity of bands on the column 8 is illustrated in FIG. 2, in which a measuring head and photomultiplier 9 is provided to sense the reflected or transmitted light or emitted radiation from the column 8 and an optical bridge 11 is provided between the measuring head 9, the monochromator 12 and the light source 13. As previously noted, the light source or the measuring head 9 could be placed in a position below the device and column if desired. The column 8 is then rotated at a fixed speed by the rotatable element 1 which is driven by drive means 6 intermeshed with the gears 10 of drive motor 7. Depending on the particular type of apparatus employed, it is also possible to move the entire support means 3 in a horizontal direction to permit scanning of the entire length of the column while it is being rotated. This would permit quantitative measurement of any or all the bands on the column.

While the present invention has been described with reference to preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

We claim:

1. A chromatographic scanning apparatus comprising the following combination:
    a. A support surface coated to minimize light reflectance;
    b. A rotatable element and drive means to rotate said element both being attached to said support surface, said rotatable element having its axis of rotation parallel to the support surface;

c. A chromatographic column;
d. Means for retaining said column in parallel rolling contact with said rotatable element;
e. A spectrophotometric device having a light source directed towards the rounded surface of the column.

2. A scanning apparatus as set forth in claim 1 wherein said rotatable element comprises a roller.

3. A scanning apparatus as set forth in claim 1 wherein said retaining means comprises a free wheeling roller attached to said support surface in spaced parallel relationship to said rotatable element.

4. A scanning apparatus as set forth in claim 1 wherein said drive means includes means to rotate said element at a fixed speed.

5. A scanning apparatus as set forth in claim 1 wherein said rotatable element has at least a portion of its surface covered with a high frictional substance to provide frictional contact between said element and the column.

6. The apparatus of claim 1 wherein the spectrophotometric device consists essentially of a measuring head, photomultiplier, an optical bridge, a monochromator and a light source.

* * * * *

UNITED STATES PATENT AND TRADEMARK OFFICE
CERTIFICATE OF CORRECTION

PATENT NO. : 3,917,413
DATED : July 17, 1974
INVENTOR(S) : Lee A. Gorman et al

It is certified that error appears in the above–identified patent and that said Letters Patent are hereby corrected as shown below:

Column 2, line 66 - the word "is" should read "in"

Column 4, lines 22 & 23 - the word --averaging-- should be in quotes.

Signed and Sealed this eighteenth Day of May 1976

[SEAL]

Attest:

RUTH C. MASON
Attesting Officer

C. MARSHALL DANN
Commissioner of Patents and Trademarks